United States Patent [19]

Mohri et al.

[11] Patent Number: 5,241,528
[45] Date of Patent: Aug. 31, 1993

[54] OPTICAL PICKUP

[75] Inventors: Masanari Mohri, Kobe; Hironori Tomita, Katano; Atsushi Ishizuka, Tokyo; Tohru Nakamura, Katano; Shinichi Tanaka, Kyoto, all of Japan

[73] Assignee: Matsushita Electric Industrial Co., Ltd., Osaka, Japan

[21] Appl. No.: 996,173

[22] Filed: Dec. 23, 1992

[30] Foreign Application Priority Data

Dec. 27, 1991 [JP] Japan .................................. 3-347533

[51] Int. Cl.$^5$ .......................... G11B 7/08; G02B 7/02
[52] U.S. Cl. ................................. 369/219; 369/44.15; 369/247; 359/814; 359/824
[58] Field of Search ............ 369/215, 219, 220, 44.16, 369/44.15, 244, 247, 256; 359/814, 824; 350/245, 255

[56] References Cited

U.S. PATENT DOCUMENTS

| | | | |
|---|---|---|---|
| 4,646,283 | 2/1987 | Ito et al. ................................. | 369/256 |
| 4,702,555 | 10/1987 | Iguma et al. ...................... | 369/44.15 |
| 4,960,321 | 10/1990 | Takahashi ........................ | 369/44.15 |
| 5,010,246 | 4/1991 | Tsuyuguchi et al. ............... | 369/112 |
| 5,161,067 | 11/1992 | Tomiyama et al. ............... | 369/44.16 |

FOREIGN PATENT DOCUMENTS 64-40922 2/1989 Japan .

*Primary Examiner*—Stuart S. Levy
*Assistant Examiner*—Joseph A. Rhoa
*Attorney, Agent, or Firm*—Wenderoth, Lind & Ponack

[57] ABSTRACT

An optical pickup having an optical disk (22); a laser diode (11); an objective lens for forming a beam spot on the optical disk; an optical element for guiding a beam from the laser diode to the objective lens; a photodetector for converting a reflected beam from the optical disk into an information signal and an error signal; an optical holder to which at least the objective lens is secured; a first circuit board (17) to which at least the laser diode and the photodetector are attached; an optical base to which the first circuit board (17), is secured; at least the laser diode, the optical element and the photodetector being sealed by the optical holder and the optical base so as to form an optical unit; a stationary member; a second circuit board (28) secured to the stationary member; an elastic support member (21) for elastically supporting the optical unit, which is electrically connected to the first and second circuit boards; at least one permanent magnet (23) secured to the optical unit; a first drive member for driving the optical unit in a direction substantially parallel to a rotational axis of the optical disk; and a second drive member for driving the optical unit in a direction substantially perpendicular to the rotational axis of the optical disk.

2 Claims, 3 Drawing Sheets

OPTICAL PICKUP

BACKGROUND OF THE INVENTION

The present invention relates to an optical pickup for optically reading an information signal recorded on a disklike recording medium.

Recently, portable use and personal use of compact disk players and data file apparatuses employing optical disks are gaining momentum and thus, optical pickups for use in these apparatuses are also required to be made smaller in size, especially in thickness. Thus, in response to recent demands for further reduction in size and thickness of such apparatuses, studies on reduction in size and thickness of optical pickups, an essential constituent element of the apparatuses, are widely conducted.

FIG. 1 schematically shows a known optical pickup for reading an information signal recorded on a disk 1 acting as an information recording medium. The known optical pickup includes a laser diode 2, a beam splitter 3, a mirror 4, an objective lens 5, a photodetector 6, an optical base 7 and an actuator 8 for actuating the objective lens 5. The optical base 7 has a boxlike shape and is made of synthetic resin or a metal. The laser diode 2, the beam splitter 3, the mirror 4 and the photodetector 6 are fixed to the optical base 7, while the objective lens 5 is incorporated in the actuator 8.

The known optical pickup of the above described arrangement is operated as follows. A portion of a beam emitted from the laser diode 2 is reflected by the beam splitter 3 and is deflected by the mirror 4. Thus, an optical spot having a diameter of about 1 $\mu$m is formed on the disk 1 by the objective lens 5. Then, a beam reflected by the disk 1 takes reversely the route of the beam incident upon the disk 1 and is transmitted through the beam splitter 3 so as to be incident upon the photodetector 6. A light receiving face of the photodetector 6 is divided into a number of light receiving regions. By calculating signals detected by the respective light receiving regions, the information signal recorded on the disk 1, a focusing error signal corresponding to runout of the face of the disk 1 and a tracking error signal corresponding to eccentricity of recording tracks formed on the disk 1 are detected. On the basis of the focusing error signal and the tracking error signal, follow-up control of the objective lens 5 for runout of the face of the disk 1 and eccentricity of the recording tracks of the disk 1 is performed by the actuator 8 so as to actuate a focusing servomechanism and a tracking servomechanism.

However, in the above described arrangement of the known optical pickup, since the actuator 8 for driving the objective lens 5 in a tracking direction and a focusing direction is mounted on the optical base 7 to which the laser diode 2, the beam splitter 3, the mirror 4 and the photodetector 6 are secured, interior of the optical base 7 is exposed to atmosphere and thus, the laser diode 2 and the photodetector 6 are separately packaged so as to prevent moisture condensation and oxidation of the laser diode 2 and the photodetector 6. Therefore, the known optical pickup has such drawbacks that not only it is difficult to reduce size and thickness of the optical base 7 but optical characteristics of the known optical pickup deteriorate due to adherence of dust to or moisture condensation on a light transmission face of a package of each of the laser diode 2 and the photodetector 6 and surfaces of other optical elements.

SUMMARY OF THE INVENTION

Accordingly, an essential object of the present invention is to provide, with a view to eliminating drawbacks inherent in conventional optical pickups, an optical pickup which not only is compact, thin and low-cost but exhibits stable optical characteristics without any effect of adherence of dust to and moisture condensation on faces of optical elements and a light transmission face of a package of each of a laser diode and a photodetector.

In order to accomplish this object of the present invention, an optical pickup according to the present invention comprises: an optical disk which acts as a recording medium; a laser diode which acts as a light source; an objective lens which receives a beam emitted from the laser diode so as to form a beam spot on the optical disk; an optical element for guiding to the objective lens, the beam emitted from the laser diode; a photodetector which receives a reflected beam from the optical disk so as to convert the reflected beam into an information signal and an error signal of the optical disk; an optical holder which is made of a metal or synthetic resin and to which at least the objective lens is secured; a first circuit board on which an electrical wiring pattern is formed and to which at least the laser diode and the photodetector are attached so as to be electrically connected to the first circuit board; an optical base which is made of a metal or synthetic resin and to which the first circuit board is secured; the optical element being secured to the optical holder or the optical base such that a gap is defined between the optical element and a light receiving face of the photodetector; at least the laser diode, the optical element and the photodetector being sealed by the optical holder and the optical base so as to form an optical unit; a stationary member which has a reference surface substantially perpendicular to a rotational axis of the optical disk and is so disposed as to define a gap between the reference surface and the optical unit; a second circuit board on which an electrical wiring pattern is formed and which is secured to the stationary member so as to be electrically insulated from the stationary member; an elastic support member for elastically supporting the optical unit, one end of which is attached to the first circuit board so as to be electrically connected to the first circuit board and the other end of which is attached to the second circuit board so as to be electrically connected to the second circuit board; the support member being arranged to supply electric power to the optical unit and transmit the information signal and the error signal from the photodetector to outside of the optical unit; at least one permanent magnet which is secured to the optical unit; a first drive member which is provided on the stationary member and produces a first electromagnetic force with the permanent magnet so as to drive the optical unit in a direction substantially parallel to the rotational axis of the optical disk; and a second drive member which is provided on the stationary member and produces a second electromagnetic force with the permanent magnet so as to drive the optical unit in a direction substantially perpendicular to the rotational axis of the optical disk.

Meanwhile, inert gas may be hermetically filled in the optical unit.

By the above described arrangement of the optical pickup, since not only the objective lens, the laser diode, the optical element and the photodetector are provided integrally with the optical holder and the optical base as the optical unit but interior of the optical unit is sealed or inert gas is hermetically filled in the optical unit, interior of the optical unit is not exposed to atmosphere. Therefore, packaging for preventing moisture condensation and oxidation of the laser diode and the photodetector becomes unnecessary and the optical unit can be not only made compact and thin but produced at low cost. Furthermore, it becomes also possible to avoid deterioration of optical characteristics of the optical pickup due to adherence of dust to or moisture condensation on a light transmission face of each of a package of the laser diode and the photodetector and surfaces of other optical elements

BRIEF DESCRIPTION OF THE DRAWINGS

This object and features of the present invention will becomes apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
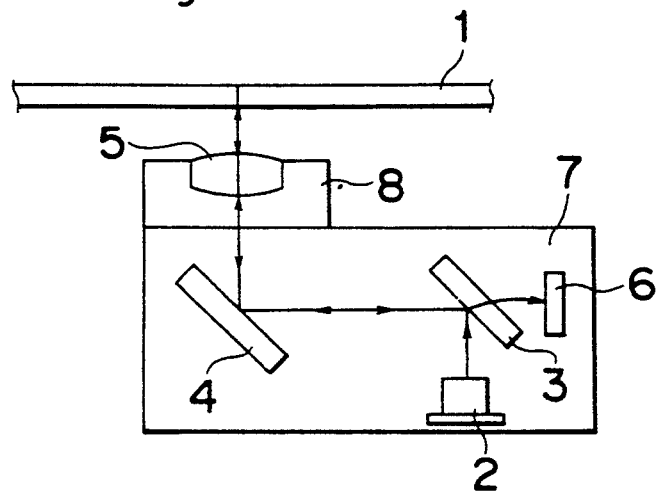
FIG. 1 is a schematic view of a prior art optical pickup (already referred to)

Referring now to the drawings, there is shown in FIGS. 2 to 5, an optical pickup K for reading an information signal recorded on a disk 22 acting as an information recording medium, according to the present invention. The optical pickup K includes a laser diode 11, a mount member 12 having the laser diode 11 fixed thereto, a mirror 13, a prism 14 having faces 14a, 14b and 14c, an objective lens 15 and a photodetector 16 having a light receiving face divided into a number of light receiving regions.

The optical pickup K further includes a substantially U-shaped flexible printed circuit board 17, an optical base 18 and a boxlike optical holder 19. The prism 14 is fixed to the optical base 18 or the optical holder 19 by bonding, etc. such that the light receiving face of the photodetector 16 and the face 14b of the prism 14 confront each other with a gap therebetween. The mount member 12 of the laser diode 11 is attached to the flexible printed circuit board 17, while the photodetector 16 is connected to the flexible printed circuit board 17. By bonding, etc., the mirror 13 is attached to an inner face of the optical holder 19 and the flexible printed circuit board 17 and the objective lens 15 are attached to an outer face of the optical holder 19. Interior of the optical base 18 and the optical holder 19 is sealed and defines space for an optical unit.

A pair of printed circuit boards 20 are, respectively, secured to a pair of leg portions of the flexible printed circuit board 17. A plurality of terminals which are electrically connected to a wiring of the flexible printed circuit board 17 are formed on an outer face of each of the printed circuit boards 20. One end of each of a plurality of support members 21 is fixed to each of the terminals on each of the printed circuit boards 20 by soldering, etc. such that the support members 21 longitudinally extend substantially in parallel with recording tracks of the disk 22, i.e. in a direction perpendicular to the face of the sheet of FIG. 3. The support members 21 have electric conductivity and flexibility and are formed by metal wires, etc.

Meanwhile, a pair of permanent magnets 23 are, respectively, secured to opposite outer sides of the optical holder 19 by bonding, etc. such that a magnetizing direction of the permanent magnets 23 is substantially parallel to the longitudinal direction of the support members 21. A pair of magnetic yokes 24 are fixed to a stationary member 25 and are made of non-magnetic material. A focusing drive coil 26 is wound around each of the magnetic yokes 24 substantially in parallel with the disk 22 such that a gap is defined between the focusing drive coil 26 and each of the permanent magnets 23. Likewise, a tracking drive coil 27 is wound around each of the magnetic yokes 24 substantially perpendicularly to the disk 22 and substantially in parallel with the support members 21 such that a gap is defined between the tracking drive coil 27 and each of the permanent magnets 23.

Furthermore, a printed circuit board 28 is fixed to the stationary member 25. The other end of each of the support members 21 is attached to each of terminals of the printed circuit board 28 by soldering, etc. Thus, the optical unit constituted by the optical base 18, the optical holder 19, the permanent magnets 23, etc. is movably supported by the support members 21 so as to be moved in the directions of the arrows F and T for focusing and tracking, respectively. Beam spots 29 and 30 are formed on the photodetector 16 as shown in FIG. 5.

In the optical pickup K of the above described arrangement, a beam emitted from the laser diode 11 is reflected by the mirror 13 and then, is separated into a reflected beam and a refracted beam by the face 14a of the prism 14. Since the gap is formed between the prism 14 and the photodetector 16, a portion of the beam refracted by the face 14a of the prism 14 proceeds towards the face 14b and is subjected to total reflection on the face 14b so as to be transmitted through the face 14c. Meanwhile, another portion of the beam refracted by the face 14a proceeds towards the face 14c so as to be subjected to total reflection on the face 14c and is transmitted through the face 14b so as to be incident upon one of the light receiving regions of the photodetector 16 such that the beam spot 29 is formed on the light receiving region of the photodetector 16. Furthermore, the beam reflected by the face 14a of the prism 14 is converged by the objective lens 15 so as to form a minute beam spot on the disk 22. Subsequently, a beam reflected by the disk 22 takes reversely the route of the beam incident upon the disk 22 so as to be refracted by the face 14a of the prism 14 and then, is transmitted through the face 14b so as to be incident upon a plurality of the light receiving regions such that the beam spot 30 is formed on the light receiving regions of the photodetector 16.

Figure 5:
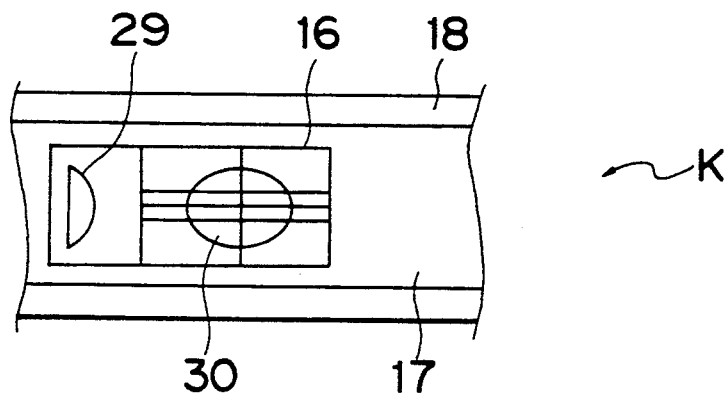
FIG. 5 is a fragmentary schematic view of the optical pickup of FIG. 2.

FIG. 5 shows states of the beam spots 29 and 30 formed on the photodetector 16. The beam spot 29 is formed on the single light receiving region of the photodetector 16. On the other hand, the beam spot 30 is formed on a plurality of the light receiving regions of the photodetector 16. Signals detected in the respective light receiving regions of the photodetector 16 are externally guided to a pre-amplifier, an arithmetic circuit and an amplifier through the flexible printed circuit board 17, the printed circuit boards 20, the support members 21, the printed circuit board 28, etc. Thus, an optical output control signal of the laser diode 11 can be obtained from a signal based on the beam spot 29. On the other hand, a focus error signal, a tracking error signal and the information signal can be obtained by calculating a signal based on the beam spot 30.

Meanwhile, drive current for the laser diode 11 is controlled on the basis of the above mentioned optical output control signal such that optical output emitted from the laser diode 11 becomes substantially uniform. Drive current for the laser diode 11 is supplied to the laser diode 11 by way of the printed circuit board 28, the support members 21, the printed circuit boards 20, the flexible printed circuit board 17, etc.

Figure 2:
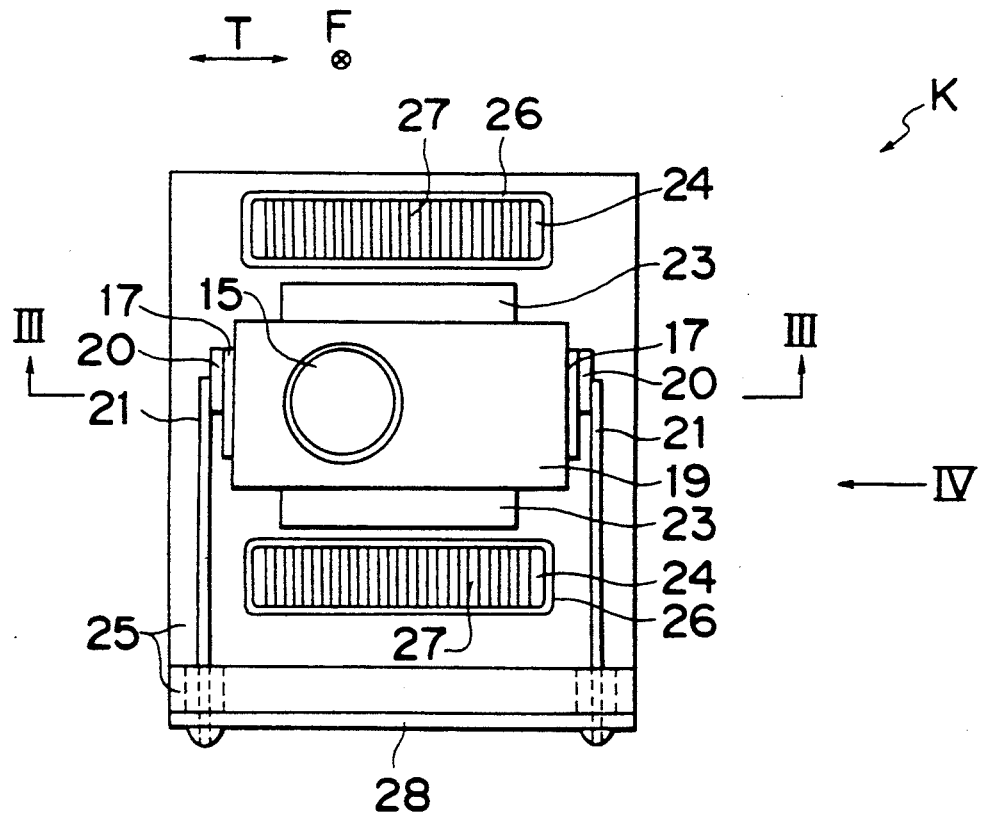
FIG. 2 is a top plan view of an optical pickup according to the present invention.
Figure 3:
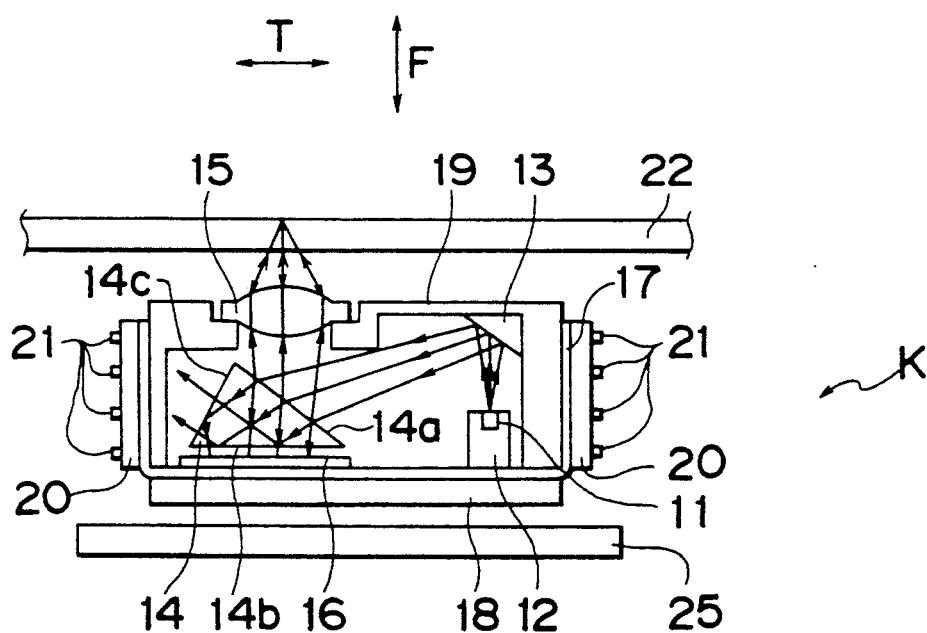
FIG. 3 is a schematic sectional view of the optical pickup of FIG. 2 taken along the line III—III in FIG. 2.
Figure 4:
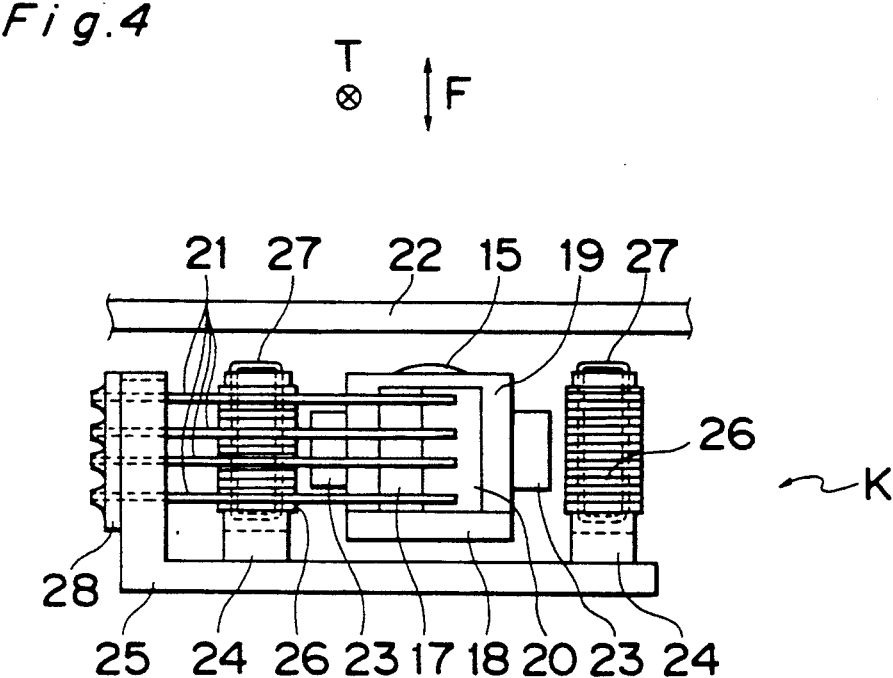
FIG. 4 is a side elevational view of the optical pickup of FIG. 2 as observed in the direction of the arrow IV of FIG. 2.

Furthermore, when electric current outputted from a servo circuit (not shown) is applied to the focusing drive coils 26 of FIGS. 2 and 4 on the basis of the focusing error signal referred to above, a propulsive force oriented in the direction substantially perpendicular to the disk 22, i.e. in the direction of the arrow F is generated in the permanent magnets 23. As a result, the optical unit including the objective lens 15 is displaced in the direction substantially perpendicular to the disk 22, i.e. in the direction of the arrow F while deforming the support members 21 such that a focusing servomechanism for effecting follow-up control for runout of the face of the disk 22 is actuated. Similarly, electric current is applied to the tracking drive coils 27 on the basis of the tracking error signal, a propulsive force oriented in the radial direction of the disk 22 in a plane substantially parallel to the disk 22 is generated in the permanent magnets 23. Consequently, the optical unit including the objective lens 15 is displaced in the radial direction of the disk 22, i.e. in the direction of the arrow T while deforming the support members 21 such that a tracking servomechanism for effecting follow-up control for eccentricity of recording tracks of the disk 22 is actuated. Meanwhile, inert gas may be hermetically filled in the optical unit.

As is clear from the foregoing description of the optical pickup of the present invention, since the optical unit is constituted by the platelike optical base having the laser diode, the prism, the photodetector and the flexible printed circuit board fixed thereto and the boxlike optical holder having the mirror and the objective lens fixed thereto, interior of the optical unit has a sealed state. Therefore, the optical pickup can be operated quite stably optically without being affected by dust and moisture condensation.

Furthermore, since the laser diode and the photodetector are sealed in the optical unit and thus, are not required to be packaged in contrast with prior art optical pickups, the optical pickup can be not only made more compact and thinner but produced at lower cost.

Meanwhile, if not only interior of the optical unit is set in a sealed state but inert gas is hermetically filled in the optical unit, it is possible to avoid oxidation of the laser diode and the photodetector in addition to effects of dust and moisture condensation.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An optical pickup comprising:
   an optical disk which acts as a recording medium;
   a laser diode which acts as a light source;
   an objective lens which receives a beam emitted from said laser diode so as to form a beam spot on said optical disk;
   an optical element for guiding to said objective lens, the beam emitted from said laser diode;
   a photodetector which receives a reflected beam from said optical disk so as to convert the reflected beam into an information signal and an error signal of said optical disk;
   an optical holder which is made of one of a metal and synthetic resin, and to which at least said objective lens is secured;
   a first circuit board on which an electrical wiring pattern is formed and to which at least said laser diode and said photodetector are attached so as to be electrically connected to said first circuit board;
   an optical base which is made of one of a metal and synthetic resin, and to which said first circuit board is secured;
   said optical element being secured to one of said optical holder and said optical base, such that a gap is defined between said optical element and a light receiving face of said photodetector;
   at least said laser diode, said optical element and said photodetector being sealed by said optical holder and said optical base so as to form an optical unit;
   a stationary member which has a reference surface substantially perpendicular to a rotational axis of said optical disk and is so disposed as to define a gap between said reference surface and said optical unit;
   a second circuit board on which an electrical wiring pattern is formed and which is secured to said stationary member so as to be electrically insulated from said stationary member;
   an elastic support member for elastically supporting said optical unit, one end of which is attached to said first circuit board so as to be electrically connected to said first circuit board and the other end of which is attached to said second circuit board so as to be electrically connected to said second circuit board;
   said support member being arranged to supply electric power to said optical unit and transmit the information signal and the error signal from said photodetector to outside of said optical unit;
   at least one permanent magnet which is secured to said optical unit;
   a first drive means which is provided on said stationary member and produces a first electromagnetic force with said permanent magnet so as to drive said optical unit in a direction substantially parallel to the rotational axis of said optical disk; and
   a second drive means which is provided on said stationary member and produces a second electromagnetic force with said permanent magnet so as to drive said optical unit in a direction substantially perpendicular to the rotational axis of said optical disk.

2. An optical pickup as claimed in claim 1, wherein inert gas is hermetically filled in said optical unit.

* * * * *